UNITED STATES PATENT OFFICE 2,040,997

ESTERS OF BORIC ACID

Frank Willard Johnson, Pennsgrove, N. J., assignor to E. I. du Pont de Nemours & Company, Wilmington, Del., a corporation of Delaware No Drawing. Application June 20, 1935,
Serial No. 27,537

18 Claims. (Cl. 260—98)

This invention relates to new chemical compounds, their methods of preparation, and their uses, and more particularly to new boric acid esters which are obtained by using boric acid to esterify long chain alkyl esters of carbamates containing a polyhydroxy substituent upon the nitrogen atom.

A great variety of materials have been proposed as detergents but many of them are unsatisfactory in certain applications. For example, in washing wool, and particularly in the scouring of raw wool, free alkali is very detrimental to the fibre, making it harsh and decreasing its strength. Most of the detergents available are, however, only effective in the presence of free alkali. The materials described herein, on the other hand, are very effective scouring agents in neutral or acid solution.

This invention has as an object the preparation of new chemical compounds. Another object is to provide novel and easily conducted processes for preparing technically valuable compounds from relatively cheap starting materials. A further object is the application of these compounds to washing and treating textile fabrics and other bodies. A still further object is their use as thickeners and protective agents. Another object is their application in a variety of miscellaneous technical uses. Other objects will appear hereinafter.

These objects are accomplished by the following invention according to which boric acid is used to esterify compounds having the general formula:

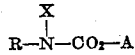

in which R stands for a polyhydroxy substituted aliphatic radical, X represents hydrogen or an alkyl group, and A stands for an aliphatic hydrocarbon radical containing a chain of eight or more carbon atoms. The products thus obtained are then used as detergents, textile agents, thickeners, etc.

The manner in which these compounds may be formed is made clear from the following example, which illustrates but does not limit the invention.

Example 407 parts by weight of N-methyl N-sorbityl dodecyl carbamate (1 mol.) are stirred with 6295 parts by weight of hot water and a solution of 124 parts of boric acid (2 mols.) in 500 parts of hot water is added. The mixture is stirred until uniform, and 320 parts of 25% sodium hydroxide solution are added. A colorless, very viscous gel is obtained.

Washing tests show that a solution containing 0.1% of the active ingredient is a remarkably fine scouring agent for badly soiled wool even in 0.1% sulfuric acid solution. This body is also an excellent protective agent for preparation of emulsions and is useful as a thickener for dye pastes and a variety of other suspensions and emulsions.

N-methyl N-sorbityl dodecyl carbamate is prepared by treating methyl glucamine with dodecyl chlorcarbonate.

The invention comprehends various departures from and modifications of the preferred procedure set forth in the example given above. Variations may be made with respect to the starting materials employed for making the products of this invention and with respect to the manner in which esterification and neutralization are effected.

The proportions of boric acid, alkali, and water used can be varied within wide limits. The manner of preparation may vary with the individual compound, but in general, one mole of boric acid is used for each two hydroxy groups in the compound being esterified, and in this case the product is believed to have a structure similar to the following:

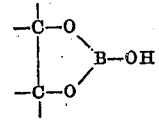

before neutralization. While boric acid is the preferred esterifying agent, boron trioxide may be used in its place. While water is usually preferred as a solvent, other solvents such as alcohol may sometimes be used. It is sometimes desirable to accomplish esterification in a non-aqueous rather than in an aqueous medium.

Other neutralizing agents beside sodium hydroxide, such as sodium bicarbonate, potassium hydroxide, ammonium hydroxide, the methyl amines, the ethanol amines, diethyl amine, butyl amine, benzyl amine, piperdine, morpholine, etc., may be used for preparing suitable salts of these esterification products. The term "boric acid esters" is used in a generic sense in this specification and in the appended claims to refer to boric acid derivatives of carbamates irrespective of whether the acid hydrogen atom connected to the boron atom has been neutralized or not.

While the invention has been illustrated with reference to esterification of a compound possessing the structural formula:

it is to be understood that the invention embraces the esterification of compounds having the general formula:

as explained above. While A stands for dodecyl in the compound given in the example, it may represent any aliphatic hydrocarbon radical containing a chain of eight or more carbon atoms. Preferably, A represents an alkyl group containing a straight chain of from ten to twenty carbon atoms, such as decyl, dodecyl, tetradecyl, hexadecyl, octadecyl, and eicosyl. X usually stands for a short chain alkyl group such as methyl, ethyl, or butyl, or for a hydrogen atom. R usually stands for a polyhydroxy substituted aliphatic radical derived from a sugar such as glucose, fructose, galactose, mannose, xylose, arabinose, etc. The radicals R and X are derived from the sugar amine from which the carbamate is made. Suitable sugar amines, which may be employed for making the carbamates which are used as intermediates in the preparation of the compounds of the present invention, are methyl glucamine, glucamine, ethyl glucamine, hydroxyethyl glucamine, galactamine, methyl galactamine, mannamine, methyl fructamine, arabinamine, xylamine, methyl xylamine, butyl xylamine, etc. A method of preparing these and other sugar amines which may be used in preparing the carbamates employed as intermediates in the present invention is fully set forth in U. S. Patents 1,994,467; 2,016,962; and 2,016,963 issued to Flint and Salzberg.

The new compositions covered in this case belong to the class of surface active or capillary active materials in that they have colloidal properties and may therefore, be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, oils and oils processed by oxidation, polymerization, sulfonation, etc. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew proofing. They may be used alone or in combination with other materials for lustering or delustering fabrics. They may be used as assistants in silk degumming liquors and silk soaking solutions. They can also be used to assist in twist setting in yarn and in processes of stripping colors.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulfur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry these compositions function as useful wetting agents in soaking, deliming, bating, tanning, and dyeing baths. They are useful in softening and treating baths for hides and skins, particularly in baths used for fat-liquoring leather.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of salad oils and cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, acid, or alkaline liquors. They may be used for paint, varnish, and lacquer cleaners.

They may advantageously be employed as cleansing agents in hard water and where a fatty or oily film resists the ordinary cleansing media. They may be added to soap in acid or hard water baths, since these compositions do not form precipitates so readily in hard and acid waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used as anti-spattering agents for fats such as lard substitutes and butter substitutes. They may be used to stabilize rubber latex. They may also be used as frothing and collecting agents in ore flotation processes, and in other processes such as the recovery of fixed oil from the oil sands. The uses mentioned will suggest many similar ones.

The compounds of the present invention possess great advantage as detergents since they are very effective in the presence of acid, whereas a great many of the prior art detergents are only effective in the presence of free alkali which is frequently detrimental to the fiber being treated. This property makes these products especially valuable in wool scouring since free alkali tends to make wool harsh and to decrease its strength. The high degree of viscosity of the compounds herein disclosed makes them useful as thickeners. Because of their stability in acid, these compounds are especially valuable as protectants for emulsions or suspensions which must be, or may become, acid.

As many apparently widely different embodiments of this invention may be made without widely departing from the spirit and scope thereof, it is to be understood that the invention is not limited to the specific embodiments thereof except as defined in the appended claims.

I claim:

1. Boric acid esters of compounds having the general formula:

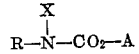

in which R stands for a polyhydroxy substituted aliphatic radical, X represents hydrogen or an alkyl group, and A stands for an aliphatic hydrocarbon radical containing a chain of eight or more carbon atoms.

2. The alkali metal salts of the boric acid esters defined in claim 1.

3. Boric acid esters of compounds having the general formula:

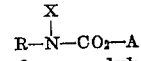

in which R stands for a polyhydroxy substituted aliphatic radical derived from a sugar, X represents hydrogen or an alkyl group containing less than five carbon atoms, and A stands for an alkyl group containing a straight chain of from ten to twenty carbon atoms.

4. The alkali metal salts of the boric acid esters defined in claim 3.

5. Boric acid esters of compounds having the general formula:

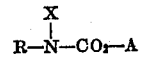

in which R stands for an aliphatic radical containing from four to six carbon atoms and from four to six hydroxy groups, X represents hydrogen or an alkyl group containing less than five carbon atoms, and A stands for an alkyl group containing a straight chain of from ten to twenty carbon atoms.

6. The alkali metal salts of the boric acid esters defined in claim 5.

7. Boric acid esters of compounds having the general formula:

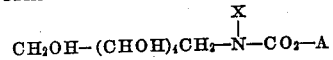

in which X represents hydrogen or an alkyl group containing less than five carbon atoms, and A stands for an alkyl group containing a straight chain of from ten to twenty carbon atoms.

8. The alkali metal salts of the boric acid esters defined in claim 7.

9. Boric acid esters of compounds having the general formula:

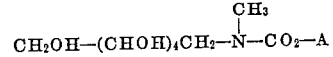

in which A stands for an alkyl group containing a straight chain of from ten to twenty carbon atoms.

10. The alkali metal salts of the boric acid esters defined in claim 9.

11. Boric acid esters of compounds having the formula:

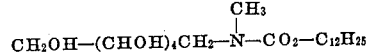

12. The alkali metal salts of the boric acid esters defined in claim 11.

13. A process of making a new detergent which comprises adding a solution of 2 mols of boric acid in hot water to a solution of 1 mol. of N-methyl N-sorbityl dodecyl carbamate in hot water, stirring until uniform, and neutralizing with a solution of caustic soda.

14. A process of making a new detergent which comprises adding a solution of 124 parts of boric acid in 500 parts of hot water to a solution of 407 parts of N-methyl N-sorbityl dodecyl carbamate in 6295 parts of hot water, stirring the mixture until it is uniform, and neutralizing the mixture with 320 parts of a 25% sodium hydroxide solution.

15. Boric acid esters of compounds having the formula:

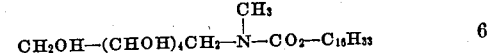

16. The alkali metal salts of the boric acid esters defined in claim 15.

17. Boric acid esters of compounds having the formula:

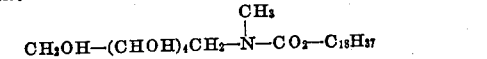

18. The alkali metal salts of the boric acid esters defined in claim 17.

FRANK WILLARD JOHNSON.